Dec. 17, 1957     C. G. STUCKE     2,816,784
SEAL
Filed Dec. 28, 1955
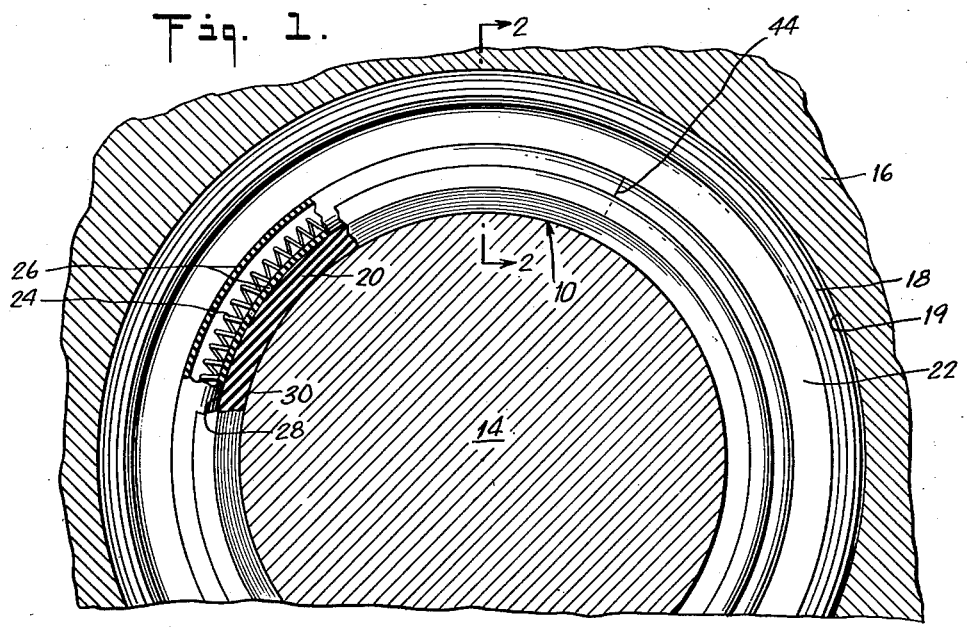
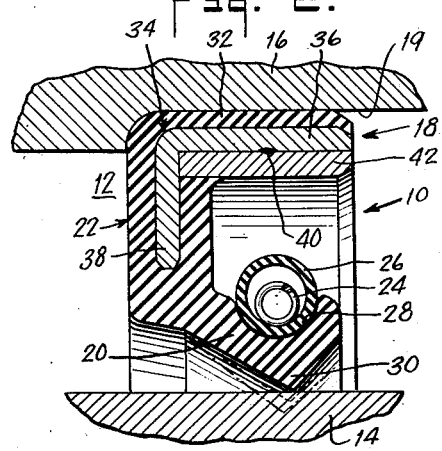
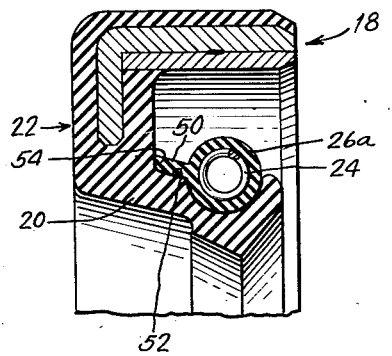
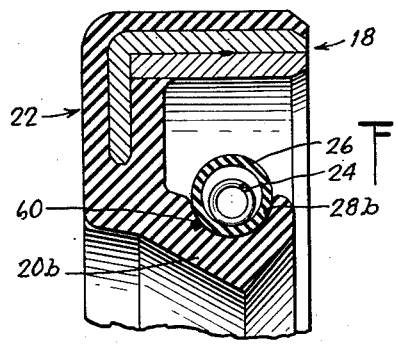
INVENTOR.
CHARLES G. STUCKE
BY Robert Henderson
ATTORNEY

United States Patent Office 2,816,784
Patented Dec. 17, 1957

2,816,784
SEAL

Charles G. Stucke, Palmyra, N. Y., assignor to The Garlock Packing Company, Palmyra, N. Y., a corporation of New York Application December 28, 1955, Serial No. 555,968

3 Claims. (Cl. 288—2)

This invention relates to seals for effecting a seal between two relatively rotatable members as, for example, a shaft and a bore in a machine casing through which the shaft extends. It relates, more particularly, to improved means by which a circular spring is retained in place as a part of the device.

The invention is particularly useful in seals intended for use in association with shafts of substantial diameter although it is not necessarily limited to use with such large shafts. Where such large shafts are employed, the annular space for the seal is very small in relation to the diameter of the shaft. Acceptable shaft eccentricity relatively to the bore in the machine casing may be quite substantial so that, because of lack of space, it is not feasible to employ a common expedient of providing a radial flange on the seal for holding a garter spring in place. Additionally, the garter spring tension is quite substantial in such a seal in service so that, before the seal goes into service, the contractile force of the spring strongly tends to cause it to roll or slide out of a groove provided for it in the sealing flange.

The principal object of this invention, therefore, is the provision of improved means, occupying very little space, for preventing such a garter spring from becoming disassociated from the seal either before being put into service or while in service.

The mentioned object is accomplished, according to this invention, by providing a resilient tube, of rubber or similar resilient material, accommodating the garter spring therewithin, said tube being adhesively fixed into a groove provided for said spring in the sealing flange of the device.

Several embodiments of this invention are presented in the accompanying drawing, for illustrative purposes, without, however, limiting the invention to those particular embodiments.

In the drawing:

Figure 1 is an end elevational view of a seal according to a preferred embodiment of this invention as it appears in sealing position between a shaft and a surrounding machine casing; the seal being partly broken away to show details and the shaft and machine casing being shown in section.

Fig. 2 is a sectional view substantially on the line 2—2 of Fig. 1.

Figs. 3 and 4 are views, substantially similar to Fig. 2, but showing seals according to other embodiments of the invention.

In Figs. 1 and 2, the seal 10 is shown in sealing position in an annular space 12 between a shaft 14 and a surrounding machine casing 16. The seal, as illustrated, consists chiefly of an annular, generally cylindrical, mounting portion 18 in fixed sealing association with a cylindrical surface 19 defining the space 12, a flexible, annular sealing flange 20, an annular, radial wall 22 integrating said portion 18 and flange 20, and a tensioned, garter, coil spring 24 within a flexible tube 26. The tube 26 is adhesively fixed into an annular groove 28 in the flange 20, the arrangement being such that the contractile force of the tensioned spring 24 operates to urge the sealing flange 20 radially inwardly to maintain a sealing lip 30 of said flange firmly and continuously in sliding sealing association with the surface of shaft 14.

The sealing flange 20, the main body of wall 22 and the outer peripheral part 32 of mounting portion 18 are preferably of relatively soft, resilient rubber, synthetic rubber or other rubber-like material. The outside radial diameter of the seal before installation is somewhat greater than the diameter of space 12 at surface 19.

Extending around and within part 32 is a reinforcing ring 34, preferably of suitable metal, having a cylindrical flange 36 serving as a reaction portion for radially confining the part 32 between it and surface 19 when, upon installation, the seal is squeeze-fitted into the space 12. The reinforcing ring also has a radial flange 38 embedded within and reinforcing wall 22. If, in a given size of seal, it is considered that flange 36 may not be sufficiently rigid, its rigidity may be enhanced by spotwelding thereinto, as at 40, a metal band 42.

It will be understood that, in manufacturing the seal, the metal ring 34 with band 42 (if the latter is used) is placed within a mold with a suitable blank or blanks of rubber material or the like, so that, in a molding operation, the mentioned metal parts are integrated into their illustrated association with sealing flange 20, wall 22 and part 32. As molded, the sealing flange 20, at its sealing lip 30, may advantageously be of somewhat smaller inside diameter than the diameter of shaft 14 with which the seal is to be used, as indicated by dotted lines in Fig. 2, so that, when the seal is installed upon the shaft, the sealing flange 20 will be stretched to some extent to its condition as shown in full lines and, hence, tend to hug the shaft.

After the mentioned molding has been completed, the tube 26, with the spring 24 already disposed therein, is secured into groove 28 by means of a suitable, preferably flexible adhesive, the latter being applied over the entire area between the intimately associated surface portions of said tube and groove. As the circular spring 24, in its untensioned condition as before association with the sealing flange 20, is smaller in its inside diameter than the bottom of groove 28, the spring becomes tensioned upon installation into said groove, thereby contracting the flange 20 so that before installation of the seal, the angularity of said flange in relation to wall 22 is about as indicated by dot-and-dash lines in Fig. 2. In that condition, it is apparent that, without adequate retaining means, the spring would not stay in place in the seal. The tube 26, however, effectively prevents dislodgment of the spring in seals employing this invention.

The tube 26 and the spring 24 are preferably initially assembled apart from the rest of the seal. Said tube may be cut from a long length of suitable rubber or rubber-like tubing, the cut length being just about long enough that with its ends abutting as at 44 in Fig. 1, it will seat quite accurately into the groove 28. The inside diameter of a cross-section of the tube may be only slightly greater than the outside diameter of a cross-section of the garter spring or, as shown in Fig. 2, said tube diameter may be considerably greater than said spring diameter.

The garter spring 24 is initially a straight coil spring the ends of which are adapted either for hook interconnection to form a circular spring or they are adapted to be interconnected by having the spring's coils at one end screwed into the coils at its opposed end in a manner well understood by those familiar with the art relating to this invention.

The spring, in its straight form, is inserted endwisely into the tube 26, but, before such insertion, the spring is preferably lubricated to facilitate such insertion and also to prevent or minimize snubbing of the spring action by the tube when the seal is in use. Upon completion of such insertion, the ends of the tube are shirred back upon the spring to expose the ends of the latter to enable them to be interconnected into a spring of circular shape. Then the shirred-back tube ends are spread back over the end portions of the spring into abutment as at 44 in Fig. 1. The tube 26, then in circular form with the spring 24 within it, is in condition to be adhesively disposed in the groove 28 as already explained.

The embodiment of Fig. 3 differs from that of Figs. 1 and 2 chiefly in that the tube 26a is formed with a close fit about spring 24 and has an integral circumferential flange or flap 50 which intimately overlies and is adhesively fixed to adjoining surfaces 52 and 54 of sealing flange 20 and wall 22. The added adhesion of the flange 50 affords greater assurance that the tube and the spring enclosed by it will not become separated from the remainder of the device.

The embodiment of Fig. 4 differs from that of Figs. 1 and 2 only in that a supplemental circumferential groove 60 is formed in groove 28b. When the adhesive is applied within the latter groove, it flows into groove 60; then, when the adhesive sets, it not only bonds the tube 26 into the groove 28b but, in addition, the body of adhesive in groove 60 serves as a key which affords greater assurance that the tube and the spring enclosed by it will not become separated from the remainder of the device.

While all illustrated embodiments are adapted for squeeze-fitting within a shaft bore in a machine casing, this invention may be embodied in a seal adapted for squeeze-fitting upon a shaft and so designed that such a tube-held spring will urge a sealing flange radially outwardly into sliding sealing association with a surrounding, fixed, cylindrical surface.

It should be obvious that this invention may be embodied in various other seal structures and, more particularly, may have means other than those shown and described herein for causing effective adhesion of a spring-holding, flexible tube to a sealing flange, all without departing from the concept underlying this invention.

I claim:

1. An annular seal comprising an annular mounting portion adapted for fluid-tight, fixed association with a cylindrical surface of one of two intertelescoping relatively rotatable members, a wall extending radially from said mounting portion, and an annular, flexible sealing flange extending axially from said wall and having a sealing portion adapted for sliding, sealing association with a cylindrical surface of the other of said members; said flange having a continuous annular groove in a surface thereof opposite to said sealing portion and the device further including a circular, interiorly non-corrugate, flexible tube, substantially coextensive circumferentially with said groove and adhesively held within the latter, and a circular spring within said tube adapted to urge said sealing portion toward said cylindrical surface of said other member.

2. A seal according to claim 1, said tube having an integral flap adhesively fixed to a surface of said sealing flange exterior of said groove.

3. A seal according to claim 1, said groove having therein a supplemental groove with adhesive therein serving as a key between the sealing flange and said tube.

References Cited in the file of this patent

UNITED STATES PATENTS

| 2,535,634 | Hubbard | Dec. 26, 1950 |
| 2,581,817 | Simmer | Jan. 8, 1952 |
| 2,695,550 | Baxter | Nov. 30, 1954 |
| 2,729,481 | Chambers et al. | Jan. 3, 1956 |

FOREIGN PATENTS

| 580,871 | Great Britain | Sept. 23, 1946 |